United States Patent [19]

Bertocchio et al.

[11] 4,000,168
[45] Dec. 28, 1976

[54] CARBOXYLATED POLYFLUOROAMINES

[75] Inventors: René Bertocchio, Saint-Genis-Laval; Louis Foulletier, Oullins; Jean-Pierre Lalu, La Mulatiere, all of France

[73] Assignee: Produits Chimiques Ugine Kuhlmann, Paris, France

[22] Filed: Aug. 6, 1974

[21] Appl. No.: 495,220

Related U.S. Application Data

[63] Continuation of Ser. No. 132,571, April 8, 1971, abandoned.

[30] Foreign Application Priority Data

Apr. 14, 1970  France .................. 70.13307

[52] U.S. Cl. .................. 260/404.5; 106/3; 106/10; 260/561 HL
[51] Int. Cl.$^2$ .................. C07D 103/38
[58] Field of Search .................. 260/404.5, 561 HL

[56] References Cited

UNITED STATES PATENTS

| | | | |
|---|---|---|---|
| 2,764,603 | 9/1956 | Ahlbrecht | 260/404.5 |
| 3,016,406 | 1/1962 | Brace | 260/561 HL X |
| 3,251,853 | 5/1966 | Hoke | 260/404.5 X |
| 3,600,415 | 8/1971 | Sweeney | 260/404.5 |

FOREIGN PATENTS OR APPLICATIONS

| | | |
|---|---|---|
| 677,816 | 1/1964 | Canada |
| 1,560,544 | 1/1968 | France |

OTHER PUBLICATIONS

Royals, Adv. Org. Chem., Reprint 1956, Prentice Hall, pp. 616–617.

*Primary Examiner*—Helen M. McCarthy
*Attorney, Agent, or Firm*—Pennie & Edmonds

[57] ABSTRACT

This invention relates to carboxylated polyfluoroamine compounds of the general formula

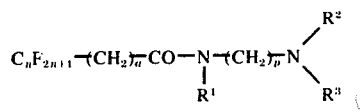

wherein the radical $C_nF_{2n+1}$— is a straight or branched perfluorinated chain, $n$ is an integer from 1 to 20, $a$ is an integer from 2 to 10, $p$ is an integer from 1 to 10, $R^2$ and $R^3$ each is an alkyl radical containing from 1 to 6 carbon atoms and $R^1$ is a hydrogen atom or an alkyl radical containing from 1 to 6 carbon atoms and the process for their preparation.

4 Claims, No Drawings

CARBOXYLATED POLYFLUOROAMINES

This is a continuation of application Ser. No. 132,571, filed Apr. 8, 1971, now abandoned.

SUMMARY OF THE INVENTION

Carboxylated polyfluoroamine compounds of the general formula

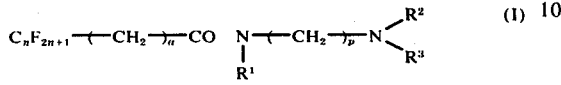

(I)

wherein the radical $C_nF_{2n+1}$— is a straight or branched perfluorinated chain, $n$ is an integer from 1 to 20, $a$ is an integer from 2 to 10, $p$ is an integer from 1 to 10, $R^2$ and $R^3$ each is an alkyl radical containing from 1 to 6 carbon atoms and $R^1$ is a hydrogen atom or an alkyl radical containing from 1 to 6 carbon atoms, prepared by reacting within a temperature range of from about 0° to about 200° C in the presence or absence of an inert solvent, the ester or chloride of a polyfluorocarboxylic acid of the general formula

(II)

with an amine of the general formula

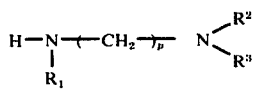

wherein the radical $C_nF_{2n+1}$, $a$, $p$, $R^1$, $R^2$ and $R^3$ have the same meaning as designated above and Y is chlorine atom or the radical —OR in which R is an alkyl radical.

DETAILED DESCRIPTION OF THE INVENTION

Esters or chlorides of a polyfluorocarboxylic acid of the general formula:

(II)

are reacted within the temperature range of from about 0° to about 200° C in the presence or absence of an inert solvent with amines of the general formula:

(III)

to yield carboxylated polyfluoroamine compounds having the general formula

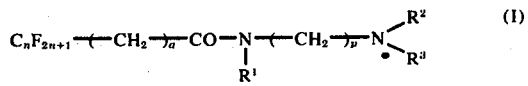

(I)

wherein the radical $C_nF_{2n+1}$, $n$, $a$, $p$, $R^1$, $R^2$, $R^3$ and Y have the same meaning designated above, according to the overall reaction

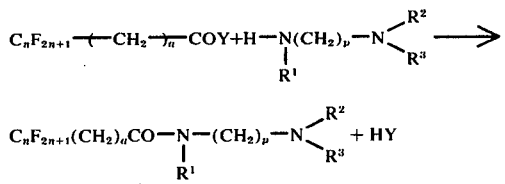

Formula (I) compounds wherein $a$ is the integer 2 or 4 and $p$ is an integer from 2 to 6 are of special interest.

The esters or chlorides of polyfluorocarboxylic acids which are useful in the process of this invention are described in French patent No. 1,560,544 of Jan. 31, 1968. It is disclosed therein that hydrolysis of perfluoroalkylene nitriles of the formula $C_nF_{2n+1}\text{---}(CH_2)_a\text{CN}$ yields the corresponding acids having the formula $C_nF_{2n+1}\text{---}(CH_2)_a\text{COOH}$. These acids may then by reacted to yield a chloride of the formula $C_nF_{2n+1}\text{---}(CH_2)_a\text{COCl}$ or an ester of the formula $C_nF_{2n+1}\text{---}(CH_2)_a\text{COOR}$.

It is advantageous, although not necessary, to carry out the process of this invention in an inert solvent. Some solvents which have been found to be useful are ethers such as ethyl ether, isopropyl ether, dioxane and tetrahydrofuran, alcohols such as ethyl alcohol and halogenated hydrocarbons such as chloroform and carbon tetrachloride.

Due to their thermal stability and surface properties, the carboxylated perfluoroamine compounds and mixtures of carboxylated perfluoroamine compounds of this invention are useful as tensio-active or surface active agents and leveling or spreading agents in various media. For example, they can be incorporated into conventional polishing waxes, greases, varnishes and paints as leveling agents in amounts conventionally used with other leveling agents in use today.

The following table lists the surface tension values of an alkali medium to which compounds of this invention have been added:

| CARBOXYLATED PERFLUOROAMINE COMPOUNDS AT A CONCENTRATION OF 100 PPM | SURFACE TENSION IN DYNES/CM AT 18.50° C 15% Aqueous NaOH |
| --- | --- |
| Solution not containing compounds | 50.10 |
| $C_6F_{13}\text{---}CH_2\text{---}CH_2\text{---}CO\text{---}NH\text{---}CH_2\text{---}CH_2\text{---}N(C_2H_5)_2$ | 25.10 |
| $C_6F_{13}\text{---}CH_2\text{---}CH_2\text{---}CO\text{---}NH\text{---}CH_2\text{---}CH_2\text{---}CH_2\text{---}N(C_2H_5)_2$ | 19.60 |
| $C_8F_{17}\text{---}CH_2\text{---}CH_2\text{---}CO\text{---}NH\text{---}CH_2\text{---}CH_2\text{---}CH_2\text{---}N(CH_3)_2$ | 18.00 |

The following examples illustrate the preparation of the carboxylated perfluoroamines of this invention.

EXAMPLE 1

11.6 g of $H_2N\text{-}CH_2\text{-}CH_2\text{-}N(C_2H_5)_2$ were added within 30 minutes to a mixture of 20.5 g of $C_6F_{13}\text{-}CH_2\text{-}CH_2\text{-}COCl$ and 100 cm³ of ethyl ether at a temperature of 20° C. During the first half of the addition operation, the reaction was exothermic (the temperature rose to 34° C) and a white solid appeared. Later, the solid disappeared and precipitated when the temperature fell to 20° C. Then the reaction medium was left at 20° C for 3 hours. 50 cm³ of water was twice added thereto and the etheral phase was recovered by decantation then dried over anhydrous sodium sulphate. After filtration of the sodium sulphate and evaporating ether, 21.9 g of amine-carbonamide, as a viscous liquid, having the formula

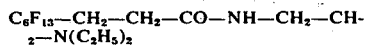

were obtained.

The yield of the reaction was 90%.

EXAMPLE 2

By proceeding as in Example 1, but utilizing 13 g of $H_2N-CH_2-CH_2-CH_2-N(C_2H_5)_2$, 21.6 g of a compound identified as $C_6F_{13}-CH_2-CH_2-CO-NH-CH_2-CH_2-CH_2-N(C_2H_5)_2$ were obtained.

The yield of the reaction was 86%.

EXAMPLE 3

5.2 g of $H_2N-CH_2-CH_2-CH_2-N(C_2H_5)_2$ were added over 30 minutes to a mixture containing 10.25 g of $C_6F_{13}-CH_2-CH_2-COCl$ and 50 cm³ of carbon tetrachloride at 78° C. When this addition had been completed, the reaction medium was maintained at 78° C for 3 hours. After cooling to 20° C, 50 cm³ of carbon tetrachloride followed by two additions of 50 cm³ water were added. The carbon tetrachloride phase was recovered by decantation and dried over anhydrous sodium sulphate. After filtering the sodium sulphate and evaporating the carbon tetrachloride, 99 g of a viscous liquid identified as $C_6F_{13}-CH_2-CH_2-CO-NH-CH_2-CH_2-CH_2-N(C_2H_5)_2$ were obtained.

The yield of the reaction was 77%.

EXAMPLE 4

By proceeding as in Example 3 but utilizing dioxane instead of carbon tetrachloride, and carrying the reaction out at 100° C, 10.5 g of $C_6F_{13}-CH_2-CH_2-CO-NH-CH_2-CH_2-CH_2-N(C_2H_5)_2$ were obtained.

The yield of the reaction was 83.5%.

EXAMPLE 5

A mixture containing 128 g of $C_8F_{17}-CH_2-CH_2-CO_2C_2H_5$ and 27.5 g of $H_2N-CH_2-CH_2-CH_2-N(CH_3)_2$ was put under constant stirring and the formation of $C_8F_{17}-CH_2-CH_2-CO-NH-CH_2-CH_2-CH_2-N(CH_3)_2$ was observed by chromatography and relative to time. The yields of the reaction were successively: 38.9%, 70.3%, 81.5% and 98.6% after 1, 2, 4 and 6 days. After the six days were over, ethanol and the excess diamine were removed by distillation under vacuum (20mm Hg). 139 g of a clean white product, requiring no purification, of the formula $C_8F_{17}-CH_2-CH_2-CO-NH-CH_2-CH_2-CH_2-N(CH_3)_2$ were obtained.

The conversion rate of the reaction was 98%.

EXAMPLE 6

111 g of $H_2N-CH_2-CH_2-CH_2-N(CH_3)_2$ were very quickly added to 570 g of $C_8F_{17}-CH_2-CH_2-CO-OC_2H_5$. When this addition had been completed, the mixture was heated to 135° C for 1 hour, then to 120° C for an additional 6 hours. When the reaction had been completed ethanol and excess diamine were removed by distillation under vacuum (20 mm Hg). A brown solid was recovered to which 600 cm³ of hexane and 28 g of active carbon were added. The mixture was heated to boiling and hot filtered. The filtrate was recovered and cooled to 0°–5° C. 543 g of a solid having a melting point of 43°–44° C, which was identified as

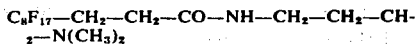

were recovered.

The yield of the reaction was 86%.

We claim:

1. A carboxylated polyfluoroamine compound of the formula

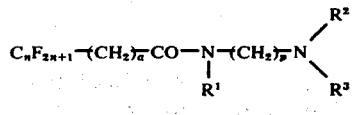

wherein the radical $C_nF_{2n+1}-$ is a straight or a branched perfluorinated chain, $n$ is an integer from 1 to 20, $a$ is an integer from 2 to 10, $p$ is an integer from 1 to 10, $R^2$ and $R^3$ each is an alkyl radical containing from 1 to 6 carbon atoms and $R^1$ is a hydrogen atom or an alkyl radical containing from 1 to 6 carbon atoms.

2. The compound of claim 1 wherein $a$ is the integer 2 or 4 and $p$ is an integer from 2 to 6.

3. The compound having the formula

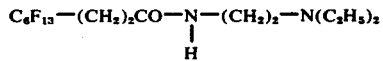

4. The compound having the formula

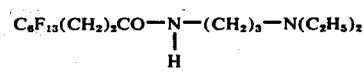

* * * * *